United States Patent
Colson et al.

(10) Patent No.: US 9,267,514 B2
(45) Date of Patent: Feb. 23, 2016

(54) BEARING COOLING CONTROL IN AN AIR CYCLE MACHINE

(71) Applicant: Hamilton Sundstrand Corporation, Windsor Locks, CT (US)

(72) Inventors: Darryl A Colson, West Suffield, CT (US); Seth E. Rosen, Middletown, CT (US); Eric Chrabascz, Longmeadow, MA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 0 days.

(21) Appl. No.: 14/508,230

(22) Filed: Oct. 7, 2014

(65) Prior Publication Data
US 2015/0034203 A1 Feb. 5, 2015

Related U.S. Application Data

(63) Continuation of application No. 12/974,529, filed on Dec. 21, 2010, now Pat. No. 8,905,707.

(51) Int. Cl.
*F04D 29/58* (2006.01)
*F04D 29/057* (2006.01)
*F16L 9/00* (2006.01)

(52) U.S. Cl.
CPC .......... *F04D 29/584* (2013.01); *F04D 29/057* (2013.01); *F16L 9/006* (2013.01); *Y10T 29/49243* (2015.01)

(58) Field of Classification Search
CPC ................ F04D 29/057; F04D 29/584; Y10T 29/49243; F16L 9/006
See application file for complete search history.

(56) References Cited

U.S. PATENT DOCUMENTS

| | | | | |
|---|---|---|---|---|
| 4,507,939 | A | * | 4/1985 | Wieland .......................... 62/402 |
| 5,113,670 | A | | 5/1992 | McAuliffe et al. |
| 5,142,762 | A | | 9/1992 | Dziorny |
| 5,224,842 | A | | 7/1993 | Dziorny et al. |
| 5,309,735 | A | | 5/1994 | Maher et al. |
| 5,310,311 | A | | 5/1994 | Andres et al. |
| 5,921,683 | A | | 7/1999 | Merritt et al. |
| 7,765,976 | B2 | | 8/2010 | Salameh et al. |
| 7,779,644 | B2 | | 8/2010 | Decrisantis et al. |
| 8,496,533 | B2 | | 7/2013 | Beers et al. |
| 2006/0059942 | A1 | | 3/2006 | McAuliffe et al. |
| 2006/0059943 | A1 | | 3/2006 | Merritt et al. |

* cited by examiner

*Primary Examiner* — Richard Edgar
*Assistant Examiner* — Juan G Flores
(74) *Attorney, Agent, or Firm* — Carlson, Gaskey & Olds P.C.

(57) ABSTRACT

An air cycle machine has a housing which holds a compressor section, and a turbine section having an expansion area, and a fan section disposed outside of the housing. A shaft, which attaches to and is coaxial with the compressor section, the turbine section and the fan section, is supported by an air journal bearing and an air thrust bearing. The shaft has a hollow core for porting cooling air from the air journal bearing and the air thrust bearing, and a tube that extends into said expansion area and communicates cooling air from the turbine expansion area to the thrust bearing.

4 Claims, 2 Drawing Sheets

BEARING COOLING CONTROL IN AN AIR CYCLE MACHINE

RELATED APPLICATIONS

This application is a continuation of prior U.S. application Ser. No. 12/974,529, filed Dec. 21, 2010, the entirety of which is herein incorporated by reference.

BACKGROUND

This application relates to air bearings incorporated into an air cycle machine and more particularly to air seals that enable cooling of the air bearings.

Air cycle machines are known, and may include a centrifugal compressor driven by compressed air and a centrifugal turbine that lowers the temperature of the compressed air. The output of the turbine is utilized as conditioned supply air for a space or components to be conditioned.

SUMMARY

According to an exemplar provided herein, an air cycle machine has a housing that holds a compressor section, and a turbine section having an expansion area, and a fan section disposed outside of the housing. A shaft, which attaches to and is coaxial with the compressor section, the turbine section and the fan section, is supported by an air journal bearing and an air thrust bearing. The shaft has a hollow core for porting cooling air from the air journal bearing and the air thrust bearing. The shaft also has, on an aft portion thereof, a forward opening and an aft opening for porting cooling air into the hollow core. A tube extends into an expansion area and communicates cooling air from the turbine expansion area to the thrust bearing and journal bearing.

According to an exemplar provided herein, a forward bearing assembly for an air cycle machine has a seal having a flat outer portion, a pair of parallel sides, the sides being attached to a flat inner portion by an angled surface. The inner portion is parallel to the outer portion creating a thickness therebetween. A cylindrical pilot is disposed in an air cycle machine housing and has a flat area for receiving the flat outer portion of the seal. The pilot has an inner diameter wherein a ratio of the forward pilot inner diameter to the thickness of the seal is 20.09-15.05:1.

According to an exemplar provided herein, an aft bearing assembly for an air cycle machine has a pilot, a seal and a seal land. The seal has a flat outer portion having a first width, a first side wall attaching to a first side of flat inner portion via a first angled wall, the flat inner portion having a second width wider than the first width, a second side wall extending radially outwardly from a second side of the inner portion via a second angled wall, an extension attaching to the second side wall and extending axially toward the first side wall and a radiused portion extending from the extension and attaching to the flat outer portion. The pilot is cylindrical and disposed in an air cycle machine housing. The pilot has a flat area for receiving the flat outer portion of the seal and has an inner diameter wherein a ratio of the forward pilot inner diameter to the thickness of the seal is 10.33-8.03:1.

According to an exemplar provided herein, an air cycle machine has a curved tube that has a length along a curving central axis and a width along the curving central axis. The central axis is curved at a radius R of 0.500±0.04 inches (or 1.3±0.1 cm) along an upper portion thereof and a ratio of the length to width of the tube is from 1.456-1.657:1.

According to an exemplar provided herein, a shaft for an air cycle machine has a hollow body, a forward flange extending radially from the hollow body, the forward flange having a first plurality of teeth radially extending teeth disposed thereon for cooperating with a seal, a first opening communicating with an interior of the body, a tooth in close proximity to and aft of the first opening, the tooth creating a barrier to air passing along the shaft and urging the air into the first opening, a second opening aft of the tooth and the second opening, and a second plurality of teeth aft of the tooth, the second opening and the first opening wherein the plurality of teeth creating a barrier to air passing along the shaft by the tooth and urging the air into the first opening.

According to an exemplar provided herein, a turbine housing for an air cycle machine has an outer shell housing a compressor section and a turbine section, and an inner shell housing a hollow shaft, and defining an expansion area between the inner and outer shell. The inner shell has a forward pilot having a first inner diameter and an aft pilot having a second inner diameter wherein the ratio between the inner diameter of the forward pilot and the inner diameter of the aft pilot is 1.668-1.664:1. The forward pilot and the aft pilot each have a half-tear drop shaped indentation at an axial edge thereof.

According to an exemplar provided herein, a method of installing a seal into an air cycle machine includes the steps of providing a first seal having an outer diameter and a thickness configured to engage a rotating surface wherein a ratio between the outer diameter and the thickness is 20.09-15.05:1, providing a housing having a first pilot having an inner diameter, and pressing the first seal into the first pilot.

These and other features of the present invention can be best understood from the following specification and drawings, the following of which is a brief description.

DETAILED DESCRIPTION

Figure 1:
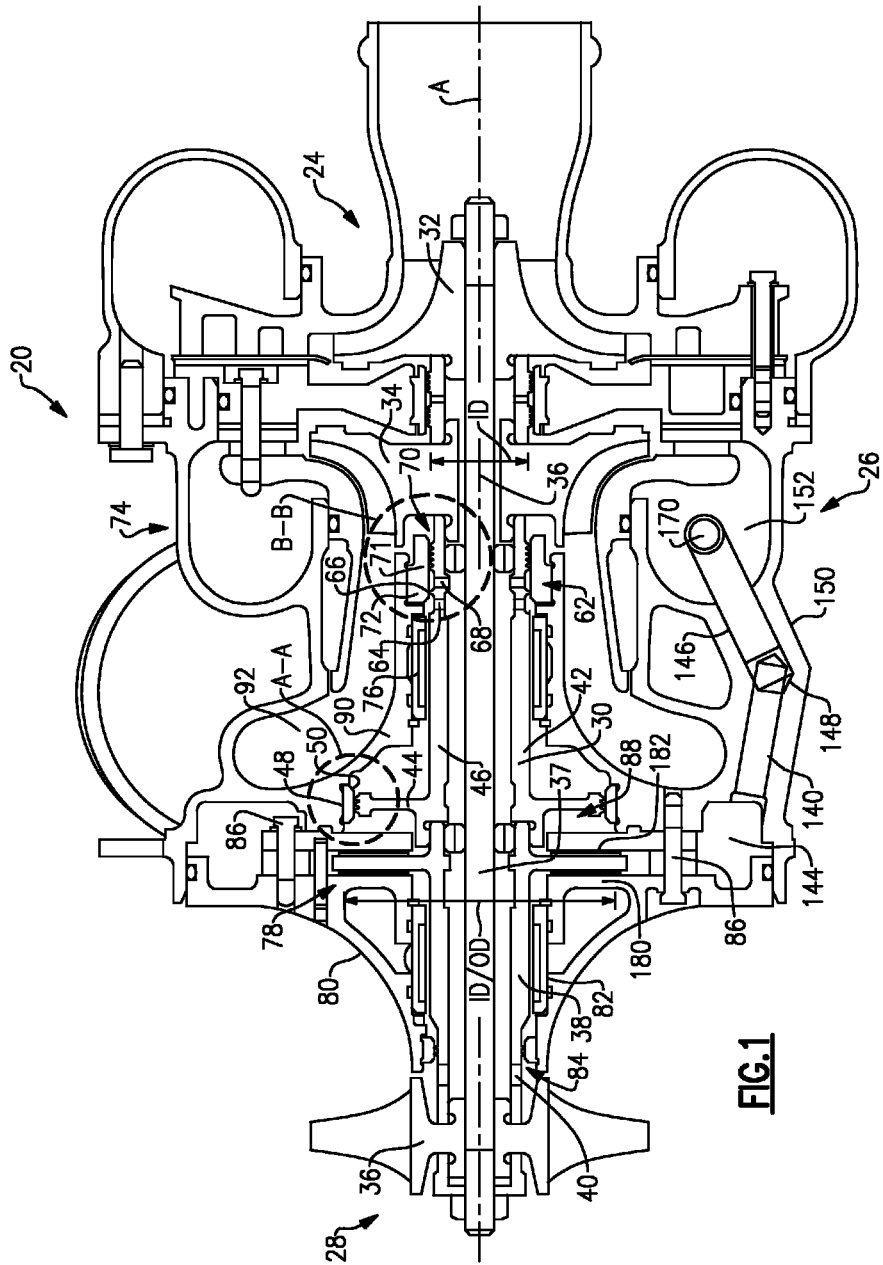
FIG. 1 shows a schematic of an air cycle machine incorporating a plurality of bearing seals.
Figure 1A:
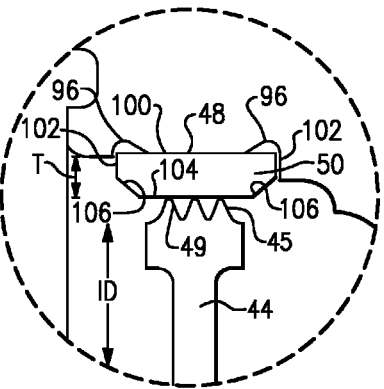
FIG. 1A shows a schematic view of bearing seal arrangement taken along the lines A-A of FIG. 1.
Figure 1B:
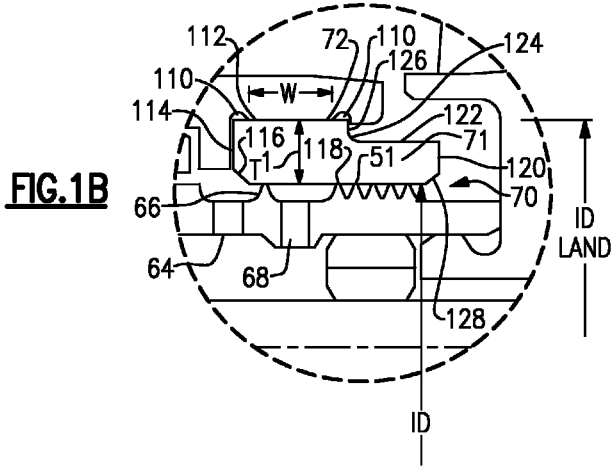
FIG. 1B shows a schematic view of bearing seal arrangement taken along the lines B-B of FIG. 1.

FIGS. 1, 1A and 1B, an example air cycle machine 20 ("ACM") that may be incorporated into an air supply system (not shown) of a vehicle, such as an aircraft, helicopter, or land-based vehicle (not shown) is shown. The ACM 20 includes a compressor section 24, a turbine section 26 and a fan section 28 all of which are generally disposed about as segmented main shaft 30. The compressor section 24 includes a compressor rotor 32. The turbine section 26 includes a turbine rotor 34, and the fan section 28 includes a fan rotor 36. The compressor rotor 32, turbine rotor 34, and fan rotor 36 are secured on the segmented main shaft 30 that has an axially extending tie rod 37 therewithin for co-rotation with the main shaft about an axis A.

A forward portion 38 of the main shaft 30 has a plurality of openings 40 to ambient and attaches to the fan rotor 36. An aft portion 42 of the main shaft attaches to the forward portion 38 of the main shaft 30 and has a circular, radially extending, flange 44 extending from a body 46 thereof to cooperate with a forward pilot 48. The flange 44 has three teeth 45 extending therefrom in register with a forward seal 50 disposed on the forward pilot 48 (e.g., a flat area on the housing 90). Each of the teeth 45 has a roughly triangular cross-section, and is nominally 0.045 in. (0.114 cm) high with a flattened upper portion 49 that is 0.010 in. (0.025 cm) wide. The ratio of height to width of each tooth 45 is about 4.5:1. An aft portion 62 of the body 46 has, a first opening 64 into the body 46 forward of a tooth 66, a second opening 68 into the body 46 aft of the tooth 66 and a second plurality of teeth 70 aft of the opening 68. The tooth 66 and the second plurality of teeth 70 are in register with an aft seal 71 mounted on an aft pilot 72, as will be discussed herein. The tooth 66 and the second plurality of teeth 70, which includes five teeth, have roughly triangular cross-sections, are nominally 0.045 in high and have a flattened upper portion 51 that is 0.010 in. (0.025 cm) wide. The ratio of height to width of each tooth 66, 70 is about 4.5:1 to ensure that a proper amount of air may leak through to cool the bearings as will be discussed infra.

The ACM 20 has an aft housing (e.g., outer shell) 74 that houses an aft air journal bearing 76, the forward and aft pilots 48, 72, the turbine section 26, the compressor section 24, the aft portion 42 of the main shaft 30, and a thrust air bearing 78. The forward housing 80 houses the forward portion 38 of the main shaft 30, a forward journal air bearing 82 and a forward air seal 84. The forward housing 80 and the aft housing 74 are attached together by bolts 86 and define an annular area 88 therebetween.

The aft housing 74 has a conical portion 90 (e.g., inner shell) that defines on a radially outer portion thereof an expansion area 92 for air exiting the turbine rotor 34. The conical portion 90, on a radially inner portion thereof has the forward pilot 48 in which the forward seal 50 is mounted the aft pilot 72 in which the aft seal 71 is mounted, and the aft journal air bearing 76 mounted between the two seals 50, 71.

Referring now to FIG. 1A, the forward pilot 48, which is flat and annular with a half teardrop-shaped cut-out 96 at either end thereof, houses the forward seal 50, which may be made of a graphite-infused polyimide material and which partially covers the half teardrop-shaped cut-outs 96 to allow air to circulate behind the seal to allow cooling thereof. The cut-out 96 insures that upon machining, no impediments are left that would interfere with mounting seal 50 on the pilot 48.

The forward pilot ID and the forward seal OD coincide at 2.410±0.001 in. (6.121±0.025 cm) and the seal forward has a thickness T of 0.140±0.020 in. (0.356±0.051 cm), wherein the ratio of the forward pilot ID to the thickness of the forward seal 50 is 20.09-15.05:1. The ratio insures the proper cooperation of the seal to a plurality of teeth, in this case three (though other numbers of teeth are contemplated), that are disposed at the end of flange 44 attached to the main shaft 30. The forward seal 50 is 0.295±0.005 in. (0.75±0.012 cm) wide to ensure the teeth 45 are always in close proximity to the forward seal 50.

The forward seal 50 has a flat back portion 100, a pair of parallel sides 102 and a top portion 104. The top portion 104, which functions as a seal land, is joined to the sides 102 by a pair of angled surfaces 106 that are disposed at a 40° angle relative to the back portion 100. The top portion interacts with the forward plurality of teeth as will be discussed infra. The seal ID is 2.246±0.001 in. (5.705±0.003 cm) and the ratio between the forward seal internal diameter and the forward seal outer diameter is 1.074-1.072:1.

Referring now to FIG. 1B, the aft pilot 72, which is flat and annular, houses the aft seal 71, which may be made of a graphite-infused polyimide material. The aft pilot 72 has an ID of 1.446±0.001 in. (3.67±0.003 cm) and the aft seal has a thickness $T^1$ of 0.16±0.02 in. (0.406±0.051 cm), wherein the ratio of the aft pilot ID to the thickness of the aft seal is from 10.33-8.03:1. The ratio insures the proper cooperation of the seal to a plurality of teeth 66, 70, in this case six (though other numbers of teeth are contemplated), that are disposed in the body 46 of the aft portion 42 of the main shaft 30. The aft pilot 72 has a width W of 0.500±0.005 in. (1.27±0.013) and the teeth 66, 70 have a height of 0.045 in. (0.114 cm) to ensure the teeth are always in close proximity to the aft seal 71.

The aft pilot 72 is flat with a half teardrop-shaped cut-out 110 machined at either end thereof. The aft seal 71 has a flat back portion 112 that mostly covers the half teardrop-shaped cut-outs 110, which insure that, upon machining, no impediments are left that would interfere with mounting aft seal 71 on the pilot 72, a forward side portion 114, a first chamfered portion 116 attaching to the forward side portion 114, and a top portion 118, which acts as a seal land, that interacts with the teeth 66, 70. The aft seal 71 also has an aft side portion 120 that attaches to the bottom portion 122 via a radius portion 124 that attaches to an axially extending portion 126. The extending portion 126 attaches to the flat back portion 112. The aft side portion 120 attaches to the top portion 118 via a second chamfered surface 128.

The top portion 118 interacts with the teeth 66, 70 to minimize a flow of relatively warm air flowing past the air journal bearing 76 into the expansion area 92. The tooth 66 blocks the air flowing through the air journal bearing 76 that tends to be drawn to ambient through the first hole 64 in the body 46. However, any air flowing past the tooth 66 is induced to flow into the second hole 68 to ambient. The plurality of teeth 70, which separates the aft journal bearing 76 from the turbine section 26, creates a relatively high pressure area compared to the second hole 68 to further urge the relatively warmer air flowing from the aft air journal bearing 76 to flow through the second hole 68 to ambient and keep the relatively warmer air from mixing with the relatively cool air in the turbine section 26.

The ratio between the ID of the forward seal 50 to the ID of the aft seal 71 ranges from 1.665-1.668 to one. The ratio indicates the relationship required by the forward and aft seal to properly cool the thrust bearing 78 and the air journal bearing 76. Similarly the ratio between the ID of the forward pilot 48 and the ID of the aft pilot 72 is 1.668-1.664:1.

A forward opening 40 in shaft 30 has therein adjacent to the forward air seal 84 to ensure that air passing through the forward seal 50 passes to ambient through the interior of the main shaft 30. The ratio of teeth between the first and second hole and the number of teeth aft of the second hole is about 1:5 to minimize air flow from forward of the aft plurality of teeth to aft of the aft plurality of teeth. Though one tooth and an array of five teeth are shown other numbers of teeth are contemplated.

Furthermore, the ratio of the aft teeth 66, 70 to the forward plurality of teeth 45 is about 2:1. The ratio of the forward teeth 45 to the tooth 66 between the first and second holes 64, 68 in the segmented shaft is 3:1. These ratios aid the metering of the correct flow of air from the thrust bearing 78 through the air journal bearing 76 to cool those bearings.

A first bore 140 is drilled into a bottom portion 150 of the aft housing 74 from the area 144. The first bore 140 is 0.272±0.005 in. (0.691±0.013 cm) thick and 1.16±0.03 in. (2.946±0.076 cm) long and is drilled at angle of about 15° relative to the Axis A. A second bore 146, which is nominally 0.25 in. thick and 0.85±0.03 in. (2.16 cm±0.076 cm) long past a countersunk portion 148 and is drilled at angle of about 15° relative to the Axis A and 30° relative to the first bore 140, is drilled into the bottom portion 150 of the aft housing 74 from a turbine inlet cavity 152 to intersect the first bore 140.

Figure 2:
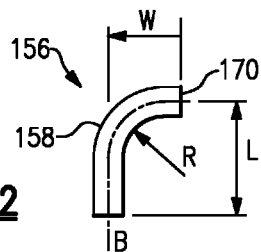
FIG. 2 is a perspective view of a tube used in the air cycle machine of FIG. 1.

Referring to FIG. 2, a curved tube 156, which is 1.18±0.03 in. (2.99±0.076 cm) long along a central axis B thereof, is 0.76±0.03 in. (1.93±0.076 cm) wide along a central axis thereof and is curved at a radius R of 0.500±0.04 inches (or 1.3±0.1 cm) along an upper portion 158 thereof. The tube 156 fits within the second bore 146 and has an opening 170 for inducing air entering the turbine inlet cavity 152 to enter the tube 156. The opening 170 is positioned into the flow of air in the turbine inlet cavity to encourage flow into the tube 156. The ratio of the length to width of the tube 156 is from 1.456-1.657:1 that insures that the tube extends properly into the turbine expansion area to draw cooling air.

Referring back to FIG. 1, air in the turbine inlet cavity 152 is captured by the tube 156 and directed through the, the second bore 146, first bore 140 into the area 144 from which it flows across the forward and aft sides 180, 182 of the thrust bearing 78. Air then migrates from the aft side 182 of the thrust bearing 78 where it is metered through the forward pilot 48 and forward seal 50, through aft air journal bearing 76 to an aft pilot 72 and aft seal 71 where the air is dumped into the interior of the main shaft 30 through first opening 64 or second opening 68 where it flows through the main shaft 30 through openings 40 to ambient. The combination of the teeth 45 in register with the forward seal 50, the teeth 66 and 70 in register with the aft seal 71, and the first and second openings 64, 68 act to meter cooling air through the thrust bearing 78 and the aft air journal bearing 76 as discussed herein above. All the teeth herein 45, 66, 70 are nominally spaced at 0.006 in. (0.015 cm) from each seal 50, 71.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A cooling tube for an air cycle machine, the cooling tube comprising:
a tube which has a length along a curving central axis and a width along said curving central axis, wherein said central axis is curved at a radius of 1.3±0.1 cm along an upper portion thereof, and wherein a ratio of the length to width of the tube is from 1.456-1.657:1.

2. The cooling tube as recited in claim 1, wherein said tube has a width of 1.93±0.076 cm along said curving central axis.

3. The cooling tube as recited in claim 2, wherein said tube has a height of which is 2.99±0.076 cm said central axis.

4. The cooling tube as recited in claim 1 wherein said tube has an opening at a terminal end thereof for inducing air to enter said tube.

* * * * *